J. C. STEARNS.

ELECTRIC CONNECTOR.

APPLICATION FILED AUG. 4, 1914.

Reissued Nov. 23, 1915. 14,020.

Witnesses:
E. M. Allen.

Inventor:
J. C. Stearns
by attorneys
Southgate & Southgate

UNITED STATES PATENT OFFICE.

JASON C. STEARNS, OF WORCESTER, MASSACHUSETTS.

ELECTRIC CONNECTOR.

14,020. Specification of Reissued Letters Patent. Reissued Nov. 23, 1915.

Original No. 1,096,138, dated May 12, 1914, Serial No. 808,142. Application for reissue filed August 4, 1914. Serial No. 855,078.

*To all whom it may concern:*

Be it known that I, JASON C. STEARNS, a citizen of the United States, residing at Worcester, in the county of Worcester and State of Massachusetts, have invented a new and useful Electric Connector, of which the following is a specification.

This invention relates to a plug or connector for electrical purposes and the principal objects thereof are to provide an absolutely certain device for connecting a circuit when the plug is pressed in, involving surfaces which are caused to rub along each other instead of simply coming into contact in a normal direction; also to provide an improved construction of the members for producing this contact; to provide an arrangement whereby the plug member can be turned to two positions, on the right and left, in one of which the circuit is made in the above mentioned manner, and in the other of which, although the plug is firmly held in the socket yet the terminals are out of contact; to provide an improved slot arrangement for securing this result; and to provide simple means whereby the plug cannot be pushed in or pulled out accidentally.

The invention also involves further details of construction which will appear hereinafter.

Figure 1:
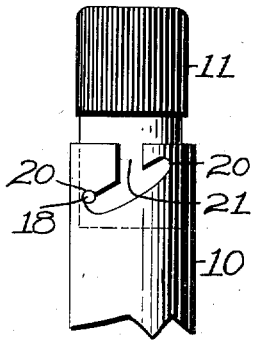
Figure 2:
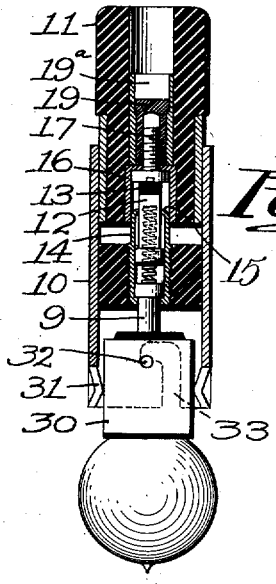
Figure 3:
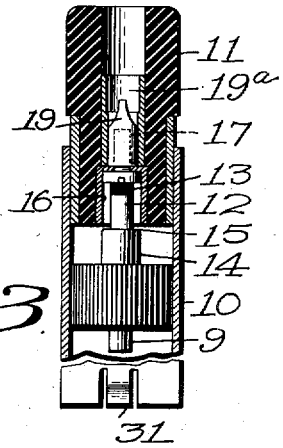
Figure 4:
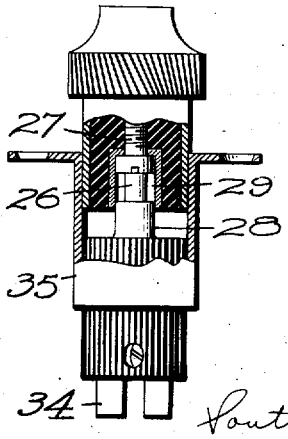
Figure 5:
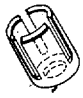
Figure 6:
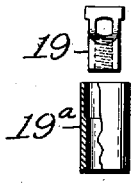

Reference is to be had to the accompanying drawings in which:

Figure 1 is a side elevation of a preferred embodiment of the invention showing it applied to a tail lamp socket and connector plug, a portion of the socket being broken away; Fig. 2 is a longitudinal central sectional view of the same with the parts in the position in which the contact is made, the position being the same as in Fig. 1; Fig. 3 is a similar view with the parts in the off position; Fig. 4 is a sectional view similar to Fig. 2 showing a modification used for a wooden dash connector; Fig. 5 is a perspective view of the slit bushing; and Fig. 6 is a side view, partly in section, of certain details.

Referring first to Figs. 1, 2 and 3 it will be seen that the connecting device comprises a socket member 10, shown in the form of a metallic shell having an insulating plug 8 therein, and a plug member 11. The socket is provided with a spring-pressed metallic plunger 12 therein, in this form having an insulating end 13 of hard rubber or the like. Surrounding this plunger is a hollow metallic guide 14 which, being mounted in the plug 8, holds the plunger in proper position and prevents its disengagement from the socket and also has at its outer end a slanting, rounded, or conical surface 15. The guide is shown as of metal, preferably brass, and is electrically connected with a metallic plunger 9 at the other end of the socket.

The parts of the plug member which engage with the plunger and guide are as follows:—The end of the plug is provided with a cylindrical axial opening in which is a slitted bushing 16. This bushing in the form shown, is made up of a piece of sheet metal pressed into cup shape, the walls having three longitudinal slits or spaces. It is secured in position by a screw 17 passing through the perforated bottom of this bushing into the body of a metallic insert 19 located in a bushing 19[a] in the hard rubber body of the plug and connected with the circuit in any desired way. The sheet metal of the bushing 16 being resilient, its three sections press inward from the walls of the central passage through the plug and form a yielding connection. On the plug, as usual, are a pair of pins 18 and the socket is provided with slots which can be of the general T-shape, but in this case each has its transverse end 20 inclined at an angle to the longitudinal part 21 of the slot. These parts 20 and 21 are for receiving the pins 18.

The length of the slitted bushing is such that when the plug is in position with the pins at the inner end of the longitudinal slots 21, the end of the bushing, which is of the same diameter as the end of the guide, comes into contact with the latter. By the turning of the plug to get the pins into their extreme lower positions, in the transverse ends 20 of the slots, as seen in Fig. 1, the guide 14 enters the spring bushing and forms a positive self-cleaning contact. The fact that the bushing is slit permits a slight yielding in order that this contact may be more intimate.

When the plug is turned to such position that the pins are in the upper end of the slot 20, the insulating end of the plunger, as shown in Fig. 3, is still engaged in the end of the opening in the plug but the insulation only contacts with the screw head and there is no electrical contact. Thus, when the current is shut off, the parts are in such position that by giving them practically only a quarter turn the current can be turned on.

As ordinarily applied to automobiles, incandescent lamps are not rigidly held and consequently they vibrate and get out of focus with the reflector. This causes them to give the appearance of flickering. To overcome this I mount the cylindrical base 30 of the lamp in the end of the cylindrical casing 10, for example, and provide the latter with resilient inwardly bent tongues 31 formed by slitting the casing longitudinally. I have shown two of these tongues oppositely placed. They are used in connection with any kind of pin 32 and slot 33. Thus the lamp is held in central position and cannot move materially in the socket. The tongue 31 also forms a perfect rubbing contact with the lamp base which is important on a lamp construction as shown.

In the form shown in Fig. 4 the conditions are similar to those shown in Figs. 1, 2 and 3 except that the plunger 26 is metallic clear to the end and consequently is capable of forming a contact with the screw 27 and completing the circuit immediately after the plug is inserted and before it is turned into its locked position. In this case there is no need of a T-shaped slot because it is impossible to hold the plug in such position in the socket that there will be no electrical connection. However, in case of lodgment of dust or other insulating particles on the screw head or the end of the plunger, the use of a slot which necessitates the turning of the plug around into locked position will insure a perfect electrical contact between the end of the guide 28 and the end of the slitted bushing 29. In this case one of the terminals 34 is connected with the casing 35 so as to ground it, the metallic casing being mounted on an insulating dash, and being itself grounded on the frame of the machine.

It will be seen therefore that the principle involved in the guide and slitted bushing permits of a certain electrical connection whenever that is desired even in case of old, worn or even dirty contacts and that the principle can be carried out in connection with the new form of slot and the locking means herein shown with certain additional advantages which have been set forth.

While I have shown the plunger and guide as mounted on the socket and the split bushing as mounted on the plug, it is obvious that the reverse arrangement may be used to attain the same results. It is also plain that the plunger guide can be slit to provide resilient arms instead of slitting the bushing. Both of these optional variations are within the scope of my invention as set forth in the claims, and I do not wish to be limited to the specific forms and details herein disclosed.

Although I have illustrated and described only two forms of the invention, I am aware of the fact that it can be carried out in many other forms and applied to many kinds of electrical connectors and attachments either in the one wire or two wire systems without departing from the scope of this invention as set forth in the claims. Therefore I do not wish to be limited in these respects but What I do claim is:—

1. A connector or coupling of the class described, comprising a socket member, a plunger therein, a metallic guide surrounding the plunger, and a plug member having a recess in alinement with said plunger and guide to receive the end of the plunger therein and provided with a metallic bushing in said recess adapted to be connected at its bottom with the circuit and having its edge in position to engage the end surface of said guide when inserted in the socket member.

2. A connector or coupling of the class described comprising a socket member, a central longitudinal spring-pressed plunger therein, a metallic guide surrounding the plunger and having an inclined end surface, and a plug member having a central recess in alinement with said plunger and guide to receive the end of the plunger therein and provided with a yielding metallic bushing in said recess and having its edge in position to engage the inclined end surface of said guide when inserted in the socket member.

3. The combination in an electrical connecting device, of a socket member provided with a hollow guide, a spring-pressed plunger projecting from the end of said guide, the end of said guide being inclined and the plunger having a non-conducting end, of a plug member having a longitudinal recess extending in from the end registering with said plunger, said recess being provided with a resilient metallic slit lining, whereby when the plug is in the socket member with the plunger pressed against the bottom of said lining the edge of the lining can come in contact with the edge of said guide.

4. The combination in an electrical connecting device, of a socket member provided with a central axial hollow guide, a spring-pressed plunger projecting from the end of said guide, the end of said guide being conical and the plunger having a metallic part and a non-conducting end, of a plug member having a central longitudinal recess extending in from the end, said recess being provided with a metallic longitudinally slit lining, means for holding said lining in position, and means whereby the plug can be held in the socket member with the plunger pressed against the bottom of said lining and the edge of the lining in contact with the conical edge of said guide.

5. The combination in an electrical connecting device, of a socket member provided with a hollow guide, a spring-pressed plunger projecting from the end of said guide, the end of said guide being conical and the plunger having a metallic part and a non-conducting end, of a plug member having a longitudinal recess extending in from the end, said recess being provided with a resilient metallic slit lining, means for holding said lining in position, a pin extending out laterally from the plug, and a slot in the wall of said socket member, said slot having a longitudinal portion and a transverse portion arranged at an inclination whereby when the pin is in the most extreme part of said transverse portion of the slot, the lining will be in contact with said guide and whereby when the pin is in the lowest part of said slot the lining and guide will be out of contact.

6. A connector or coupling of the class described, comprising a socket member having a longitudinal recess therein, a plug member fitting within said socket member and also having a longitudinal recess therein, one of said recesses having a metallic guide mounted therein and a plunger carried by that member longitudinally movable in said guide and adapted to engage the bottom of the other recess, and the other recess having a resilient metallic bushing secured therein, effective to yieldingly engage the guide when the plug and socket are in operative relation.

7. A connector or coupling of the class described, comprising a socket member, and a plug member fitting therein, one of said parts carrying a plunger spring pressed and a metallic guide surrounding said plunger, and the other part carrying a bushing alined with said plunger and guide and adapted to be connected with an electrical circuit and to receive the end of the plunger against the bottom surface, said guide and bushing resiliently engaging each other when in operative relation to form an effective electrical connection.

8. A connector or coupling of the class described, having, in combination, a socket member and a plug, each including a portion of insulating material having a recess therein, said recesses being longitudinally alined, a spring-pressed plunger in one of said recesses positioned therein by a longitudinally extended guide supported in said recess, and a bushing secured in the other recess for receiving the plunger, said bushing and said guide being effective to form an electrical connection and including resilient contacting portions.

9. A connector or coupling of the class described, having in combination, a socket member and a plug, each including a portion of insulating material having a recess therein, said recesses being longitudinally alined, a spring-pressed plunger in one of said recesses positioned therein by a longitudinally extended guide supported in said recess, and a bushing secured in the other recess for receiving the plunger, said bushing and said guide being effective to form an electrical connection and one of said members being slotted to form resilient contact arms.

10. A connector or coupling of the class described comprising a socket member and plug, each including a portion of insulated material having a recess therein, said recesses being longitudinally alined, a spring-pressed plunger in one of said recesses having an insulating end, a longitudinally extended guide supported in that recess for the plunger, and a bushing secured in the other recess for receiving the plunger, said bushing and guide being adapted to form an electrical connection and including resilient contacting portions.

11. A connector or coupling of the class described, comprising a socket member having a longitudinal recess therein, a plug member adapted to fit within said socket member and also having a longitudinal recess therein, one of said recesses having a metallic guide mounted therein and a plunger longitudinally movable in the guide, said plunger having an insulating end adapted to engage the bottom of the other recess, said other recess having a resilient metallic bushing secured therein adapted to yieldingly engage the guide when the plug and socket are in operative relation.

12. A connector or coupling of the class described, comprising a socket member, a central longitudinal metallic guide therein having an inclined end surface, and a plug member having a central recess in alinement with said guide and provided with a yielding metallic bushing therein having its edge in position to engage the inclined edge surface of said guide when inserted in the socket member.

In testimony whereof I have hereunto set my hand, in the presence of two subscribing witnesses.

JASON C. STEARNS.

Witnesses:
CHAS. T. HAWLEY,
CATHARINE I. HARTNETT.